Figure 1:
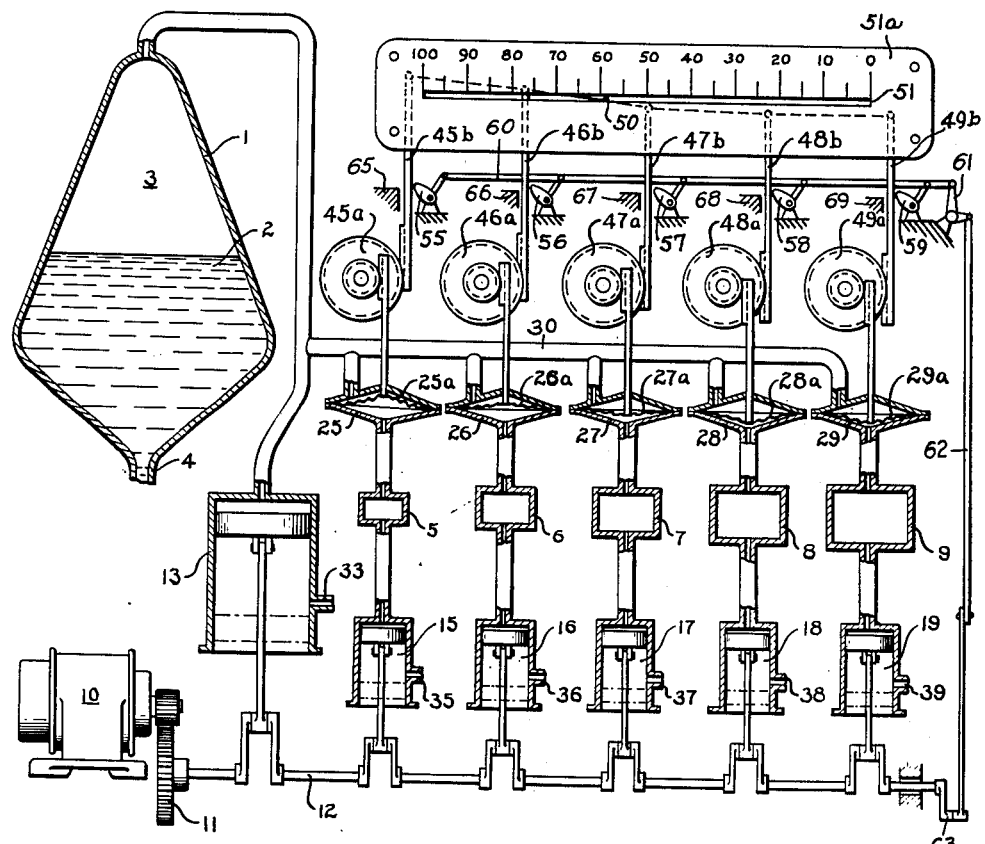

June 6, 1939.　　　　E. FISCHEL　　　　2,161,510
APPARATUS FOR MEASURING THE LIQUID CONTENTS OF A CONTAINER OR VESSEL
Filed June 17, 1937　　　2 Sheets-Sheet 1

INVENTOR.
Edward Fischel
BY Stephen Cerstvik
ATTORNEY.

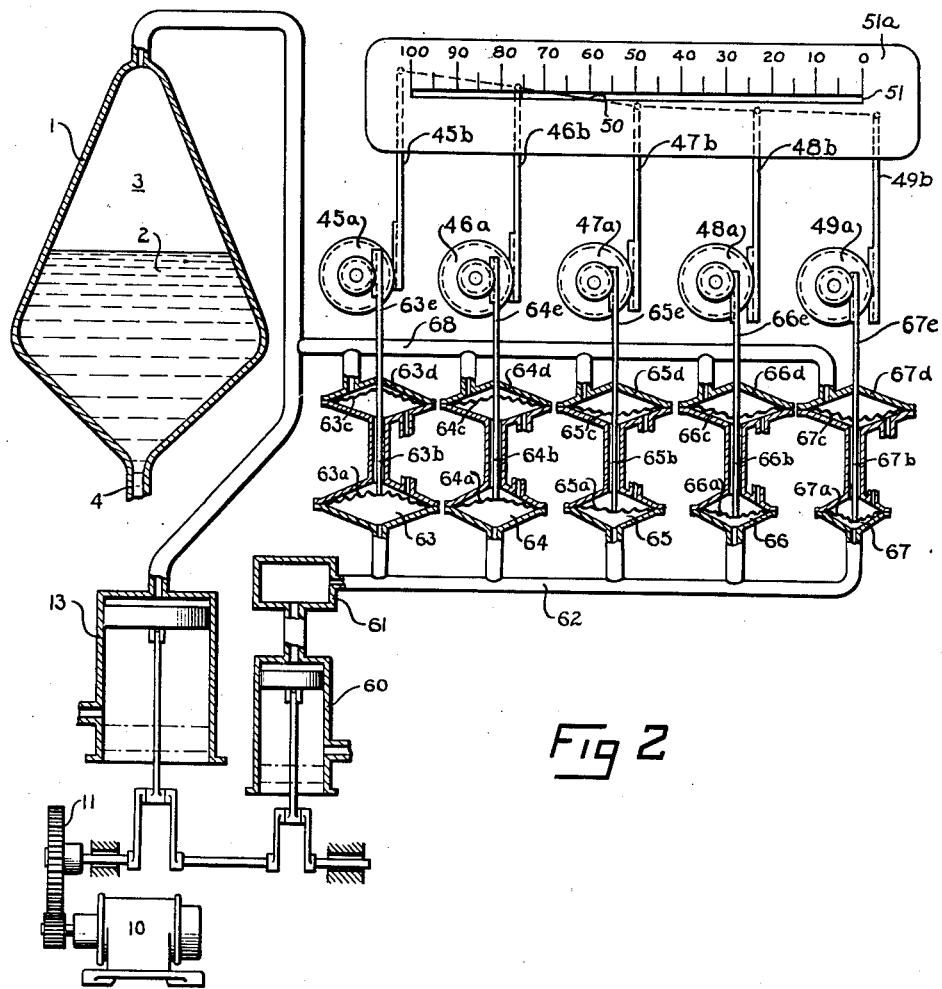

Patented June 6, 1939

2,161,510

UNITED STATES PATENT OFFICE 2,161,510

APPARATUS FOR MEASURING THE LIQUID CONTENTS OF A CONTAINER OR VESSEL

Eduard Fischel, Berlin-Charlottenburg, Germany, assignor to Siemens Apparate und Maschinen Gesellschaft mit beschränkter Haftung, Berlin, Germany, a corporation of Germany Application June 17, 1937, Serial No. 148,787
In Germany June 3, 1936

12 Claims. (Cl. 73—290)

This invention relates to apparatus for measuring the liquid contents of a container or vessel, such, for example, as a gasoline tank which may be located at a remote point and has for an object to provide a novel and improved system for the above purpose.

Another object of the invention is to provide a system of the above type in which the measurements are made by introducing standard quantities of air into the tank and into a measuring apparatus and comparing the pressures thus produced.

Another object is to provide a system in which a graduated set of standard pressures are developed, one or more of which correspond closely to the pressure within the container.

Various other objects and advantages will be apparent as the nature of the invention is more fully disclosed.

The novel features which are believed to be characteristic of this invention will be particularly pointed out in the claims appended hereto but the invention will be better understood by referring to the following description, taken in connection with the accompanying drawings, in which certain specific embodiments thereof have been set forth for purposes of illustration only.

In the drawings:

Fig. 1 is a diagrammatic representation illustrating one embodiment of the invention in which the pressure within the container is compared with a graduated set of standard pressures; and Fig. 2 is a diagrammatic representation illustrating a further embodiment of the invention.

Referring to the drawings more in detail, Fig. 1 shows a container 1 containing a quantity of liquid 2 above which is a space 3. The liquid may be drawn through the pipe 4 for use as, for example, in driving an engine. For measuring the level of the liquid in the container 1 there is provided a compressor 13 which is adapted to supply a predetermined volume of air to the container at each operation thereof.

According to the present invention, there are also provided a graduated set of standard pressures. In the embodiment shown in Fig. 1, these graduated pressures are produced by a series of compressors 15 to 19, each of which compress a predetermined quantity of air and supply the same to a set of receivers 5 to 9, respectively, which are, in turn, connected to a set of differential manometers 25 to 29, respectively. In the form shown, the compressors 15 to 19 are all of the same size, while the receivers 5 to 9 are of graduated sizes. Consequently, the operation of the compressors 15 to 19 produces a graduated set of pressures, depending upon the volume of the respective receivers. These graduated pressures are supplied to the differential manometers 25 to 29 as above mentioned.

It is to be understood that the graduated pressures can also be obtained in other ways, such, for example, as using compressors of different sizes and receivers of the same size or by a combination of the two methods. The compression within the compressors 13 and 15 to 19 is always initiated from atmospheric pressure by reason of the ports 33 and 35 to 39, respectively, which vent to the atmosphere. The compressors are all driven in unison by suitable means, shown in Fig. 1 as a crank shaft 12 driven by a gear 11 from a motor 10.

The manometers 25 to 29 are provided with diaphragms 25a to 29a which separate the same into upper and lower compartments, the lower compartments being connected to the receivers 5 to 9 as above mentioned. The upper compartments are connected by a pipe 30 to the space 3 within the container 1.

The manometers 25 to 29 are provided with indicating devices which, in the form shown, comprises gear trains 45a to 49a adapted to cause vertical movement of rods 45b to 49b, the upper portions of which are connected by a flexible member 50, such as a band, rubber strip or the like. Suitable designating means is provided, such, for example, as an elongated slot 51, formed in calibrated scale 51a through which the member 50 can be observed. In order to prevent the indicating devices from returning to the zero position during the return stroke of the compressors the following structure may be utilized. A series of small eccentrics 55, 56, 57, 58 and 59 are placed in proximity to the rods 45b to 49b inclusive which eccentrics are operated by means of levers 60, 61, 62 and crank 63 connected to crankshaft 12 whereby the cooperative action of the eccentrics 55—59 and abutments 65—69 the rods are locked in place during the return stroke of the compressors.

The measuring range of the individual manometers will be limited by the abutment of the diaphragms 25a to 29a inclusive with the internesting walls of the respective housings whereby the diaphragms are supported throughout their entire areas.

In the operation of the system shown in Fig. 1, a single stroke of the various compressors 13 and 15 to 19 serves to introduce a measured quantity of air into the space 3 of the container 1 and to develop a predetermined graduated set of pressures within the lower chambers of the manometers 25 to 29. The upper chambers of the manometers 25 to 29, being at the pressure developed within the space 3 of the container 1, cause the diaphragms 25a to 29a to assume a position determined by the pressure differential. If the pressure within the container 1 exactly balances the pressure within the lower compartment of one of the manometers, the diaphragm of that particular manometer will assume a central position which, through the gears above mentioned, will cause the member 50 to coincide with the zero line at that point. A suitable scale may be included to indicate the liquid level corresponding to that pressure.

If, on the other hand, the pressure within the container 1 is intermediate in value between the pressures in two of the manometers, such as the manometers 26 and 27, the diaphragm 26a will cause the rod 46b to extend somewhat above the zero line and the diaphragm 27a will cause the rod 47b to extend somewhat below the zero line. The member 50, joining the tops of these rods, accordingly crosses the zero line at a certain point which designates interpolated value of the pressure within the container 1. By referring to a suitable scale, the liquid level is determined. It is evident therefore that by observing the point at which the member 50 crosses the zero line, a true indication of the liquid level within the container 1 is obtained.

Referring to the embodiment shown in Fig. 2, the container 1, compressor 13 and driving means therefor are similar to those shown in Fig. 1 and are given the same reference characters. In this embodiment, a single compressor 60 is used for producing the standard pressure. This compressor 60 operates into a receiver 61 which is suitably designed to develop the desired standard pressure. This receiver 61 is connected by a pipe 62 to the lower chambers of a plurality of manometers 63 to 67 which are of graduated sizes. The diaphragms 63a to 67a of these manometers are connected by rods 63b to 67b to diaphragms 63c to 67c of the set of manometers 63d to 67d, the upper chambers of which are all connected by a pipe 68 to the space 3 within the container 1. The diaphragms 63c to 67c are connected by rods 63e to 67e to a set of gears 45a to 49a, similar to those described in connection with Fig. 1. These gears are adapted to operate rods 45b to 49b which are connected to a flexible member 50, as above described.

In this embodiment of the invention, the manometers 63 to 67 are graduated in size so that different forces are produced on the diaphragms 63a to 67a. The manometers 63d to 67d are, however, of the same size so that equal forces are produced on the diaphragms 63c to 67c due to pressure within the container 1. The balance between these forces causes the rods 63b to 67b to assume intermediate positions which actuate the gears 45a to 49a and the rods 45b to 49b in the manner described in connection with Fig. 1.

In this embodiment, the member 50 is caused to cross the zero axis at the point where the pressures within the container 1 and in the receiver 61 are in the same ratio as areas of the diaphragms of the manometer. The means for preventing the indicating device from being returned to zero during the return stroke of the piston are the same as illustrated in Fig. 1 and described in connection therewith.

It will be noted that, in the above-described systems, the necessity for using a complicated set of equipment is avoided and the entire measurement is obtained by comparison with standard pressures developed in standard compressors. A known quantity of compressible fluid, such as air, is introduced into the container to be measured and the pressure developed by this known quantity of fluid is compared with a series of standard pressures which are produced at the same time. The standard pressures and the air supplied to the container being measured are all developed from atmospheric pressure. Consequently, any variations due to changes in atmospheric pressure are avoided. By producing a graduated set of standard pressures, one or more of which approximate that of the pressure developed within the container, the comparison of the various pressures is facilitated and an extremely accurate measurement is obtained.

It is to be understood that any desired number of graduated pressures may be obtained and that the accuracy of the measurement will depend to some extent on the number thus selected. The process can, however, be carried out by the use of only two such pressures, in which case the point at which the flexible member 50 crosses the zero axis will interpolate the pressure readings between the two standard pressures.

Although certain specific forms of the invention have been shown for purposes of illustration, it is to be understood that the invention is not to be limited thereto, but that various changes and modifications may be made therein, as will appear to a person skilled in the art. The invention is to be limited only in accordance with the following claims when interpreted in view of the prior art.

What is claimed is:

1. A system for measuring the liquid level in a closed container, which comprises a compressor adapted to supply a measured quantity of a compressible fluid to said container, means to compress further quantities of said compressible fluid to produce thereby a graduated set of standard pressures, a set of differential manometers connected to receive said graduated pressures and to compare the same with the pressure within said container, and means associated with said manometers to indicate the pressure differentials obtaining therein.

2. A system for measuring the liquid level in a closed container, which comprises a compressor adapted to supply a measured quantity of a compressible fluid to said container, means to compress an additional quantity of said compressible fluid to obtain a standard pressure, means to derive a graduated set of forces from said standard pressure, and means to balance said forces against forces produced by the pressure within said container so as to obtain an indication therefrom of the container pressure.

3. A system for measuring the liquid level in a closed container, which comprises a compressor adapted to supply a measured quantity of a compressible fluid to said container, a set of differential manometers connected to said container so as to be responsive to the pressure therein, means to compress a predetermined quantity of said compressible fluid, means to derive a series of graduated forces therefrom, and means to supply said forces to said differential manometers for comparing said forces with the pressure produced within said container.

4. A system for measuring the liquid level in a closed container, which comprises a compressor adapted to supply a measured quantity of compressible fluid to said container, means to compress known quantities of said compressible fluid, means to obtain a graduated set of standard pressures therefrom, a set of differential manometers connected to said container so as to be responsive to the pressure therein, and means to supply said graduated standard pressures to said differential manometers for comparison with the forces developed therein by pressure within said container.

5. A system for measuring the liquid level in a closed container, which comprises a compressor adapted to supply a measured quantity of a compressible fluid to said container, means to compress a standard quantity of said compressible fluid to derive a standard pressure therefrom, means including a plurality of differential manometers having diaphragms of different areas to obtain a set of graduated forces from said standard pressure, and means for comparing said graduated forces with the forces developed by the pressure within said container.

6. A system for measuring the liquid level in a closed container, which comprises a compressor adapted to supply a measured quantity of a compressible fluid to said container, means to compress a known quantity of said compressible fluid to derive a standard pressure therefrom, a plurality of manometers connected to receive pressure from said container, a second set of manometers having diaphragms of different areas connected to receive said standard pressure, a set of movable members arranged to designate liquid level, and means actuating said members in accordance with the pressure differentials between said first manometers and said second manometers.

7. A system for measuring the liquid level in a closed container, which comprises a compressor adapted to supply a measured quantity of a compressible fluid to said container, a set of compressors adapted to compress predetermined quantities of said fluid, a plurality of receivers of graduated sizes adapted to receive the compressed fluid from said last-mentioned compressors whereby a graduated set of pressures is built up, a set of differential manometers connected to said receivers and to said container to be actuated in accordance with the pressure differentials, and means actuated by said manometers to designate the pressure within said receiver.

8. A system for measuring the liquid level in a closed container, which comprises a compressor adapted to supply a measured quantity of a compressible fluid to said container, a second compressor adapted to compress a predetermined quantity of said fluid, a set of manometers having diaphragms graduated in area, means supplying said standard pressure to said diaphragms for developing a graduated set of forces, a second set of manometers having diaphragms connected to receive pressure from said container, means interconnecting said first-mentioned diaphragms and said second-mentioned diaphragms and actuated in accordance with the pressure differentials acting thereon, and means actuated by said last-mentioned means to designate the pressure with said container.

9. A system for measuring the liquid level in a closed container, which comprises a compressor adapted to supply a measured quantity of a compressible fluid to said container, means to produce a pair of standard pressures higher and lower, respectively, than the pressure within said container, differential manometers actuated in accordance with the pressure difference between said standard pressures and the pressure within said container, a pair of members movable with said manometers to indicate by their position said pressure differences, a member connecting said last members, and a scale associated with said connecting member to indicate by its position with respect thereto the liquid level within said container.

10. A device for measuring the quantity of liquid in a closed container, comprising means for introducing a known volume of fluid into said container from a source of fluid to produce a pressure therein, means compressing a volume of fluid from said source to produce a standard pressure, a set of diaphragms having different areas, a second set of diaphragms connected to said first set, means supplying said standard pressure to one of said sets to produce a force thereby, means connecting the other of said sets to said container, whereby said other set is actuated by said produced pressure to produce a force thereby, and means for measuring the difference between the forces produced, whereby an indication of said quantity is obtained.

11. A device for measuring the quantity of liquid in a closed container, comprising means for introducing a known volume of compressible fluid into said container from a chosen source, means compressing another volume of fluid from said source whereby a standard pressure is produced, a plurality of diaphragms having different graduated areas, means connecting said standard pressure to said diaphragms whereby a graduated set of forces is obtained, a second set of diaphragms of uniform area, means supplying pressure from said container to said second set to obtain a second set of forces, and means for opposing said forces, whereby an indication of said quantity is obtained.

12. In a device for measuring the quantity of liquid in a closed container, means for introducing a measured volume of a compressible fluid into said container for producing a pressure therein, means producing a graduated set of standard pressures, and means responsive to the difference between said pressure in said container and said graduated set of pressures, whereby an indication of the quantity of liquid is obtained.

EDUARD FISCHEL.